United States Patent

[11] 3,586,300

| [72] | Inventor | Homer K. Monroe |
| --- | --- | --- |
| | | Piqua, Ohio |
| [21] | Appl. No | 841,837 |
| [22] | Filed | July 15, 1969 |
| [45] | Patented | June 22, 1971 |
| [73] | Assignee | Aerovent Fan Company, Inc. |
| | | Piqua, Ohio |

[54] BURNER UNIT
16 Claims, 7 Drawing Figs.

[52] U.S. Cl............................................. 263/19,
239/431, 431/352
[51] Int. Cl................................................... F23l 9/04
[50] Field of Search........................................... 263/19;
126/110; 431/351, 352; 239/431, 434, 509

[56] References Cited
UNITED STATES PATENTS

| 2,595,759 | 5/1952 | Buckland et al. | 431/351 X |
| --- | --- | --- | --- |
| 2,837,893 | 6/1958 | Schirmer | 263/19 |
| 3,051,464 | 8/1962 | Yeo et al. | 263/19 |
| 3,419,337 | 12/1968 | Fairbanks | 431/352 X |

*Primary Examiner*—Edward G. Favors
*Attorney*—Jerome P. Bloom

ABSTRACT: A gas burner particularly adapted to heat a passing airstream, distinguished by a chamber having at least one discharge opening in the direction of airflow and including means peripherally projected to intercept and trap a portion of the airstream and pressure it laterally through openings to said chamber in a manner to uniquely influence and support therein the ignition and complete combustion of gas. The invention units produce an optimal concentration of directed heat for raising the temperature of a passing airstream.

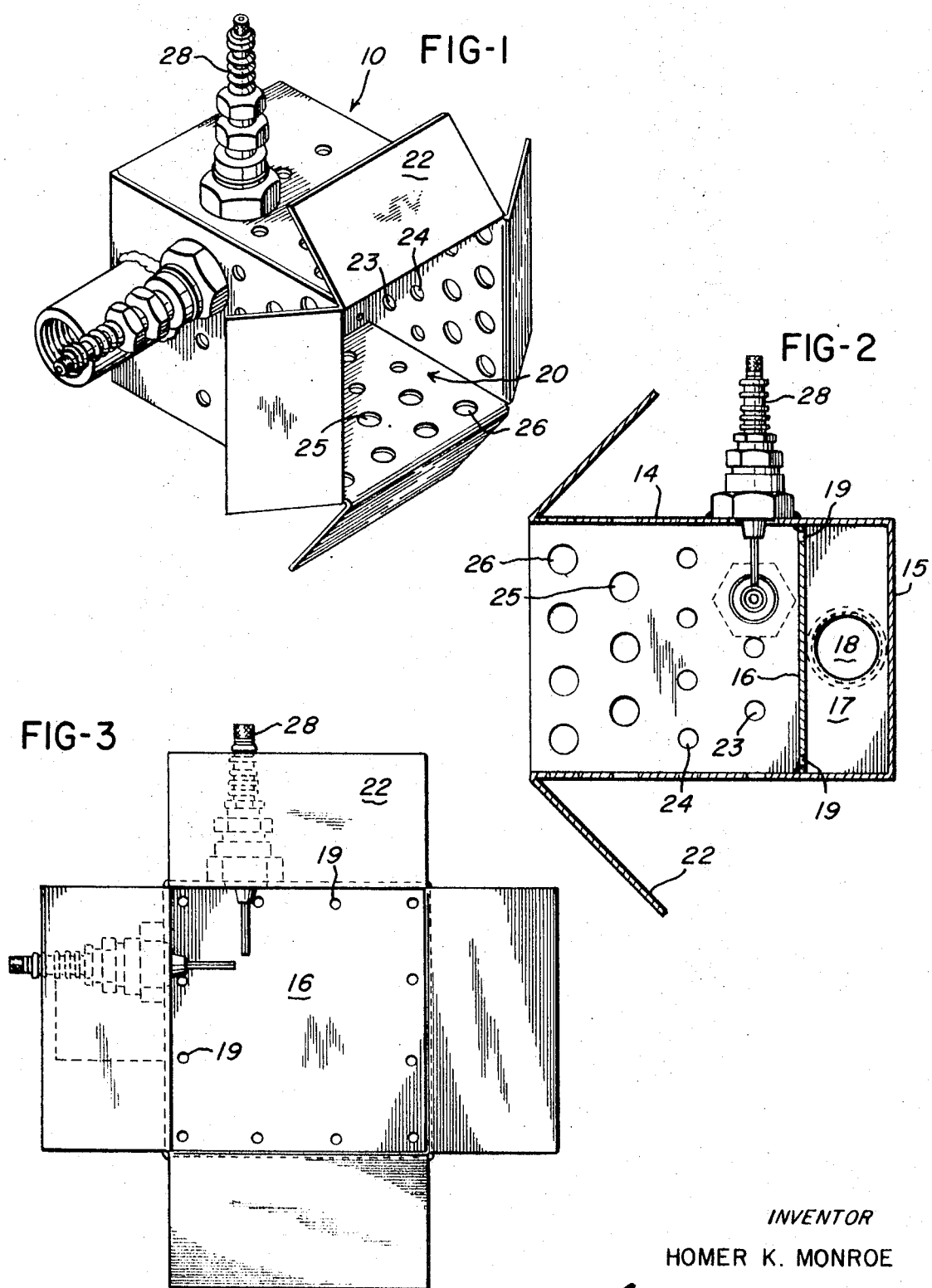

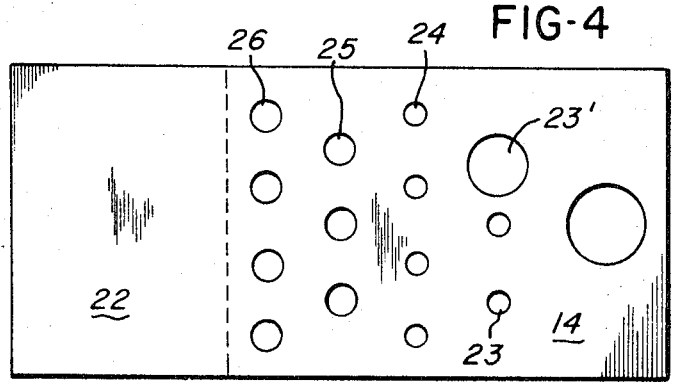
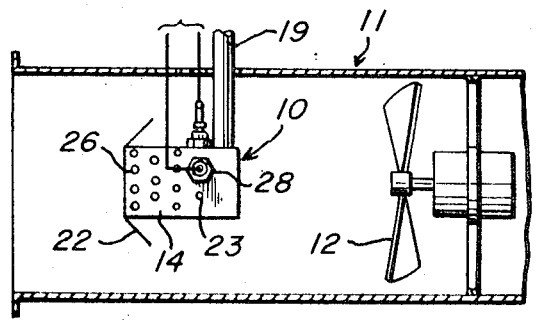
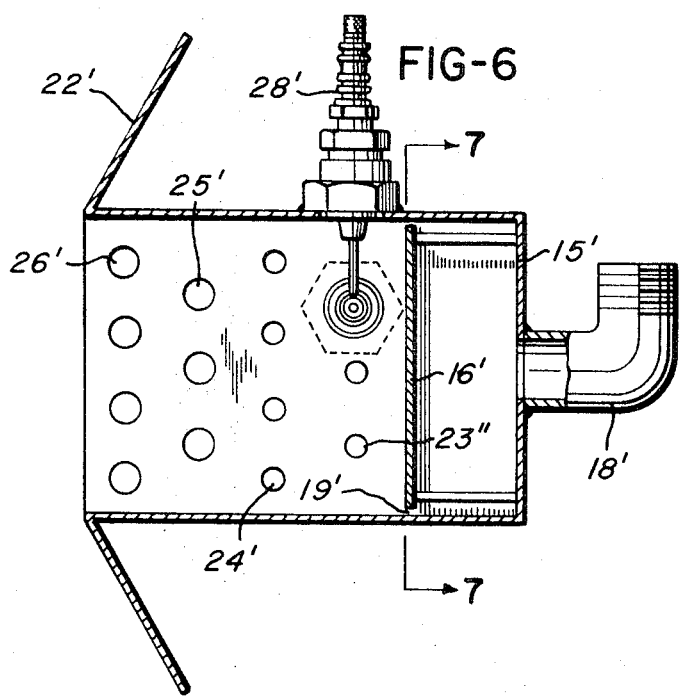
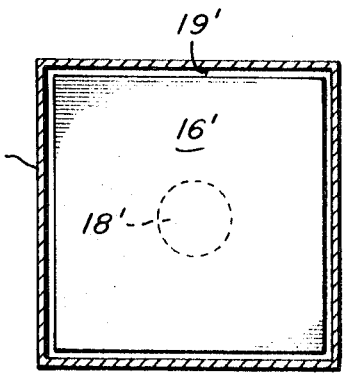

BURNER UNIT

THE INVENTION BACKGROUND

This invention is directed to improvements in gas burners of the type normally employed to heat a passing airstream. Such burners have had wide usage in commercial and industrial ventilating systems and will be so illustrated. It is noted, however, that this is merely by way of example since their application is obviously not so limited.

As here contemplated, the gas burners of the invention are simpler to fabricate, more effective and satisfactory in use, and relatively maintenance free.

The better gas burners of the known prior art, directed to similar applications, are distinguished by shielding mixing plates which project forwardly from a gas manifold in a converging-diverging relation. Such plates create two mixing chambers. In use, the passing airstream will to some extent follow the plate surfaces. However, more air will impinge directly thereon. In any case the movement of air which passes through the mixing plate apertures will tend to continue in generally the same sense. As a matter of fact, this is essential to achieving a stated objective of the convergent-divergent mixing plate construction that is to pull gas from the manifold to expedite its movement to and through the mixing or combustion chamber defined by the plates.

Prior art burner units such as here noted have proven to have a number of disadvantages and to present a number of problems. For example, the disposition of the apertured plates defining the mixing or combustion chamber thereof is such that in use a passing airstream is intercepted thereby and air passing therethrough will tend, to a great degree, to entrain rather than mix with delivered gas. This inhibits the ability to achieve complete combustion within the burner unit per se. As a matter of fact, with high rates of fuel flow, the flame produced on ignition tends to move outwardly from the related gas manifold. One might try to compensate by lengthening the mixing plates. However, this does not solve the problem and only aggravates the inherent problem of inadequate mixing of air and gas. Further, to achieve increased burning capacity, the prior art construction demands a lengthened manifold chamber. Also, the mixing plates must be made to have substantial strength since they are subjected to impact stress. Under the circumstances prevailing, size and cost of the prior art burner units cannot be minimized.

SUMMARY OF THE INVENTION

The present invention uniquely advances the art by avoiding the above problems. In a preferred type of embodiment it provides a simple receptacle shaped gas burner unit embodying a combustion chamber of generally uniform cross section which opens in the direction of airflow. The chamber wall is suitably apertured forwardly of a transversely oriented baseplate which defines in the imperforate bottom of the receptacle a gas manifold chamber. This baseplate is so designed that peripheral areas thereof dictate a jetlike flow of gas peripherally of the walls of the combustion chamber. At the open end thereof the wall of the combustion chamber is characterized by peripheral projections. The latter are designed to trap a relatively narrow layer of a passing airstream, convert its velocity to static pressure and produce in the process a lateral force inducing a pressured flow of air moving inwardly of and through the apertured walls of the combustion chamber. This produces jets of air interiorly of the combustion chamber, orienting substantially at right angles to the chamber wall and to the surrounding airstream. This arrangement dictates that on ignition of the gas there are produced in the combustion chamber a multitude of individual flames which comingle to produce a complete combustion of the gas in the combustion chamber and an optimal concentration of heat for raising the temperature of the passing airstream.

It is therefore a primary object of the invention to provide a new and improved gas burner unit which is economical to fabricate, more efficient and satisfactory in use, adaptable to a wide variety of applications and unlikely to malfunction.

Another object of the invention is to provide a simple and inexpensive gas burner unit for disposition in an airstream, the burner unit being characterized by a receptacle shaped configuration and including imperforate projections for trapping portions of the airstream and forcing the same to move laterally and to the interior of the burner unit through apertures in the wall thereof.

A further object of the invention is to produce a unique gas burner unit for disposition in an airstream characterized by a construction which in operation thereof will produce a multitude of jets of air and gas which on ignition of the gas in the presence of the air will comingle in the form of a corresponding multitude of individual flames whereby to produce an essentially complete combustion of the gas and an optimal concentration of heat.

An additional object of the invention is to provide gas burner units of substantially unitary construction distinguished by a combustion chamber of essentially uniform cross section having peripherally thereof laterally projected airflow control means for trapping and influencing the delivery to said chamber of sufficient air to support therein a complete combustion of delivered gas.

An additional object of the invention is to provide a gas burner unit possessing the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein are shown some but obviously not necessarily the only forms of embodiment of the invention, FIG. 1 is a perspective view of a gas burner unit in accordance with one embodiment of the invention;

FIG. 2 is a longitudinal section of the burner unit of FIG. 1;

FIG. 3 is a view looking into the open end of the combustion chamber provided in the burner unit;

FIG. 4 shows the pattern of one side of the burner unit prior to forming thereon an imperforate reversely bent wing portion;

FIG. 5 is a generally diagrammatic view illustrating an application of the burner unit in a door-heating system;

FIG. 6 is a longitudinal section of a modified form of the burner unit of FIG. 1; and FIG. 7 is a view taken on line 7–7 of FIG. 6.

Like parts are indicated by Similar characters of reference throughout the several views.

DESCRIPTION OF PREFERRED EMBODIMENTS

A gas burner in accordance with the invention is useful in heating makeup air, in air heating and recirculating systems generally, and in spot demand systems, for example in industrial or commercial systems for heating door areas. The preferred embodiments here illustrated will be described in reference to the latter mentioned use.

In an environmental use as illustrated in FIG. 5, the gas burner unit 10 of FIG. 1 is suitably located in a duct 11 to be spaced from the sidewalls thereof. Upstream of the burner unit 10, in relation to the direction of an airflow through the duct 11, is a fan 12. When energized, the fan 12 generates and develops a high velocity airstream which moves through the duct and around the burner unit, be heated in passage thereby and movement thereof through the adjacent open end of the duct which is remote from the fan 12.

The burner unit 10 as here illustrated has the form of a rectangular receptacle open to one end and closed to the other by an imperforate baseplate 15. Its sides are defined by four rectangularly arranged plate segments 14. The receptacle as so defined has a uniform cross section from one end to the other. As seen in FIG. 5 of the drawings, in use the burner unit 10 is positioned to have its imperforate base 15 most adjacent the fan 12, directly opposed to the airstream generated by the fan, and generally at right angles thereto.

Adjacent and spaced from its base 15 the receptacle is transversely bridged by a rectangular platelike insert 16. The latter defines, with the base 15 and the surrounding portions of the sides 14, a shallow gas manifold chamber 17. Between the base plate 15 and the manifold creating plate 16, the sides of the receptacle are imperforate except for one opening for mounting therein a gas inlet fitting 18. The latter is suitably interconnected to the delivery end of a gas pipe 19. For the purposes of the present discussion let us consider that the pipe 19 connects the manifold chamber to a supply of natural gas, under the control of valving means not here shown.

Beyond the plate 16, to the side thereof remote from the base 15, the receptacle sides 14 are provided with apertures arranged in transversely extending rows which are longitudinally spaced, the length of the sides, in the direction of the opening from the receptacle. The apertures in the sides 14 are so arranged to lie in planes spaced longitudinally of the receptacle, at right angles to its central axis. Note that the apertures 23 in the row most adjacent the manifold plate 16 are relatively small, as are the apertures 24 in the immediately following row. However, the apertures 25 and 26 in the rows most adjacent to the opening from the receptacle are larger, for purposes to be further described.

In this manner there is defined between the manifold plate 16 and the opening from the receptacle a combustion chamber 20 the sides of which include apertures which are differentially sized. Note further that the apertures in adjacent of the spaced rows are laterally offset.

Particular attention is directed to the fact that the manifold plate 16 has formed therein, in adjacent spaced parallel relation to each marginal edge thereof, a row of small apertures 19. In this manner there is defined in the manifold plate 16 a rectangular arrangement of apertures opening adjacent the respective sides of the combustion chamber 20 for delivery thereto from the manifold chamber 17 of a plurality of small high velocity jets of natural gas.

At the open end of the receptacle, which is mutually defined by the projected limits of the sides 14, each side has formed integral therewith an imperforate platelike reversely bent, projection 22. The projections 22 are bent from a common transverse plane to extend rearwardly and in an outwardly divergent relation to the base 15 to form an angle of about 45—60° with the adjacent side 14. Each wing 22 so defined forms a pocket 30 which positions to open towards the source of the passing airstream, which originates in this case at the fan 12. In cross section each pocket 30 assumes the shape of a right triangle, the vertical leg of which is defined by a portion of the adjacent side 14 of the receptacle. It will be observed that otherwise the sides 14 so dispose to align with and lie within the peripheral limits of the base 15 so as to preclude any significant impact thereon of the moving airstream.

Attention is directed to the fact that in two adjacent sides of the receptacle the row of apertures 23 most adjacent the manifold plate 16 includes an aperture 23' which is relatively enlarged and mounts therein an adapter through which projects a spark plug 28. The spark plugs 28 are thereby positioned at one corner of the combustion chamber, at right angles to each other so as to have their operative extremities in adjacent relation immediately adjacent the manifold plate 16.

Thus, as here described, the receptacle constituting the burner unit 10 is comprised of the imperforate baseplate 15 and the rectangularly arranged and relatively projected sides 14 having on their projected extremities the peripherally projected and reversely directed wing elements 22 which form the pockets 30. The manifold plate 16 is incorporated in the receptacle to form therewith an integrated unit. Accordingly, to all intents and purposes, and in fact, the burner unit of the invention is of an integrated construction requiring only the application of the spark plugs and a connection thereof to a supply of gas.

For convenience of manufacture, the burner unit may be comprised of multiple plate segments joined together as by welding to form a device handled and mounted as a unit. Thus, each side 14 may be initially formed as an individual flat rectangular plate P, as evidenced in FIG. 4 of the drawings. The sides may be made of stainless steel or the like and each punched or otherwise formed with the apertures 23 through 26 inclusive. Two of the sideplates will be modified so that one aperture 23' will be enlarged to accommodate insertion therein of a mount for a spark plug while one of the plates will have formed therein adjacent one end thereof an aperture for the gas inlet fitting 18. Looking further to FIG. 4, it will be seen that there is marked thereon a line along which the wing portion 22 may be reversely bent to form a pocket 30, as required. The baseplate 15 and the manifold plate 16 may be separately formed in a simple cutting operation and the latter drilled, punched or otherwise cut to form therein the apertures 19. As will be obvious, the sides 14 may be assembled to the rectangular configuration illustrated in which adjoining side margins of adjacent plates are substantially in contact with one another. By welding along such contacting margins the several plates are secured together. Then the baseplate 15 may be welded to one end of the uniformly rectangular tubular structure so defined. Either prior to or after the attachment of the plate 15, the plate 16 may be positioned within the rectangularly arranged sideplates 14 and suitably fixed in position by welding or the like.

From the foregoing, it may be readily seen that the burner unit can be constructed in a simple and economical manner, utilizing the simplest of tooling. The gas inlet fitting 18 and the spark plugs may be similarly mounted in a simple fashion.

Let us now review the function of the described structure, as contemplated by the present invention.

The flow of gas to the manifold chamber 17 is suitably and conventionally controlled by valving means (not shown) so that gas may be made available when the system is set in operation. As will be obvious, there will be a conventional energizing circuit to produce a spark at the operating ends of the spark plugs positioned interiorly of the combustion chamber and adjacent the manifold plate 16.

The simple and compact gas burner unit 10 may be mounted by any suitable mechanical means in the duct 11 to position the burner unit, as previously described, with the open end thereof facing the discharge end of the duct. The latter is directed to a selected localized area to be heated, as for example to an area immediately of a door which opens onto a loading dock or the like. As the burner is positioned, the fan 12 has in immediately opposed and facing relation thereto the imperforate base 15. The sides 14 are so arranged that upon energizing the fan the perforate portions thereof will not be required to lie in the path of or to have any portions of the airstream created by the fan impact directly thereon. In contrast, the imperforate wings 22, which project in a rearwardly divergent relation to the open end of the burner unit and form thereby the pockets 30, will lie directly in the path of a measured portion of the high velocity airstream which is moved through the duct 11 by the fan 12.

In the application just mentioned, provision may be made whereby the opening of the door to the loading dock will simultaneously energize suitable controls to initiate, automatically a drive of the fan 12, to open the valve means provided in the pipe 19 to admit natural gas to the manifold chamber 17 and to energize and produce an ignition spark at the plugs 28. As this occurs, the natural gas will flow, under pressure, to the manifold chamber 17 and caused to issue therefrom to the combustion chamber 20 by way of the small apertures 19 arranged peripherally of the manifold plate 16. The size of the apertures 19 is such to cause the gas to issue to the combustion chamber in fine high velocity jet form. At the same time the air stream developed by the fan 12 will move in the direction of the burner unit, a portion moving about and longitudinally of the sides thereof to have a measured portion thereof intercepted by the imperforate wings 22 on the projected end of the burner unit. Since the airstream generated by the fan 12 will have a relatively high velocity, it will contain substantial energy. As portions thereof are intercepted by the wings 22, there is created thereby a conversion of the high velocity into static pressure, the pressure building up at the wings 22 and in the process forcing the intercepted air to move laterally and rearwardly and inwardly of the differentially dimensioned apertures formed in the adjacent portions of the sides 14 which define the walls of the combustion chamber 20. There results, as has been determined in the actual test use of the described gas burner, a pressuring of air through the apertures 23 through 26 inclusive in a manner to produce jets of air which move inwardly of the combustion chamber 20 at right angles to the wall thereof. Due to the smaller dimension of the apertures 23 and 24 most adjacent the manifold plate 16, they will enter the combustion chamber at a higher velocity than the jets of air which enter the combustion chamber through the apertures 25 and 26. Nevertheless, the velocity does not approach the velocity of the airstream due to the fact that the wings 22 have effectively created a laterally pressured layer of air about the wall portions of the combustion chamber which is reflected substantially the length thereof, once the airstream has been generated to the required level.

Of course, the creation of the jets of air perpendicular to the sides of the combustion chamber and the creation of the jets of gas perpendicular to the base of the combustion chamber through the medium of the apertures 19 in the plate 16 has been substantially simultaneous, as has been the energizing of a circuit to produce an ignition spark at the operating ends of the spark plugs adjacent the plate 16. With ignition of the gas as immediately supported by the jets of air adjacent the plate 16, there is produced interiorly of the combustion chamber at each aperture in the sidewall portions thereof and at each aperture 19 a perpendicularly projected flame. The individual flames comingle so as to create a high concentration of heat with complete combustion of the delivered gas within the chamber. Particular attention is directed to the fact that the smaller jets 23 and 24 adjacent the manifold plate 16 will insure an immediate and thorough mixing of gas and air adjacent the base of the combustion chamber while substantial air is admitted through the apertures 25 and 26 to support the continuing and complete combustion of the gas within the chamber. There is thus created an interaction of the gas and air by means of the staged pressure and velocity of the air on inflow to the combustion chamber. There is little chance for any gas to escape and create any hazard in the use of the burner unit of the invention.

Of course, with the complete combustion there is an optimal heating of the sideplates of the combustion chamber and an optimal heating of the air which moves thereby, through the medium of both direct contact and convection currents. Therefore, with the use of the invention burner unit, there is a most reliable operation thereof to produce the heating of a moving stream of air as required for the designated purpose. In the case illustrated, which example is by no means limiting, the burner unit 10 enables a most compact construction and one which will remain effectively in operation until shutdown as long as the controlling door is open. When the door is closed, the system will be automatically shut down in an obvious manner well within the capabilities of one versed in the art.

Attention is directed to the fact that the invention burner unit has been tested and found to most effectively operate as described in an air stream where the velocity may range from approximately 1000 to 5000 feet per minute. The burner unit as designed is, moreover, one which is relatively unaffected by variations in firing rate or the rate of gas flow, there being a thorough mixing of the admitted air and gas in all instances and a unique flame production of the character described.

The embodiment of the invention as above described is particularly advantageous for use with natural gas.

A preferred modification found to have unique advantage in burning propane gas as well as natural gas is illustrated in FIGS. 6 and 7 of the drawing. Here the burner unit 10' can be identical in all respects with the burner unit 10 of FIGS. 1—5, except with respect to the detail of the manifold plate and the position of the gas inlet fitting identified by the numeral 18'. Here the manifold plate 16', which positions interiorly of the burner receptacle, is supported by brackets on and in adjacent spaced relation to its baseplate 15'. The plate 16' is smaller that the plate 16 and has no apertures. The plate 16' is so shaped and dimensioned to create a shallow gas manifold chamber 17' the exit from which is defined by a thin continuous slot 19' defined between the peripheral edge of plate 16' and the adjacent unperforated wall portions of the receptacle sides 14'. This slot may be 1/32 of an inch in width, for example. In this embodiment the base plate 15' has a central aperture receiving the adapter for mounting thereto the gas inlet fitting 18'. In the function of this embodiment of the invention the gas is delivered to the center of the gas manifold chamber 17', the only exit from which is the thin slot 19'. The gas will move laterally to issue from the manifold in the form of a jet wall, moving outwardly about the plate 16 and along the innermost surfaces of the sidewalls of the combustion chamber 20'.

The use of the modified gas burner makes self-evident its highly efficient operation with propane-type gas. On ignition of the gas therein, as before, individual flames stand perpendicular to the sidewalls 14' at each aperture 23' to 26' therein and at the slot 19'. Intense heat develops within the combustion chamber in this instance, to good advantage.

Thus, again in the modification described there are means defining a manifold chamber formed as an extension of the combustion chamber and having a corresponding cross-sectional configuration, there being common sidewalls extending from an imperforate base and terminating in reversely directed and outwardly divergent imperforate winglike projections. An optimal angle of the winglike projections appears to be about 60°.

The invention as here disclosed effectively avoids a need for compromise in burner construction. It dictates simplicity, economy and efficiency in its manufacture and the use of its embodiments. It satisfies the requirements of both adequate airflow to a combustion chamber and thorough combustion, even at high flow rates of gas.

The invention has been illustrated in embodiments of rectangular configuration. However, the basic concepts thereof lend themselves to incorporation in receptacles other than those of rectangular configuration. Embodiments may employ a receptacle in cylindrical, annular or ring-shaped form with similar effectiveness. The basic requirements are that the apertured wall portions of their combustion chambers be able to align with the airstream in which they may be used and that there be peripheral or outer projections for trapping a portion of the passing airstream to convert the velocity thereof into static pressure. One thereby controls the nature and the character of the air jets which are created internally of the combustion chamber.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Having thus described my invention, I claim:

1. A gas burner unit for disposition in an airstream to draw air therefrom for combustion and to heat the air stream on passage thereby comprising means defining a gas manifold including an imperforate wall section for disposition in the face of and transverse to the airstream, means defining a combustion chamber in connection with said gas manifold including apertured wall portions, said apertured wall portions disposing approximately parallel to the airstream to preclude direct or tangential impact thereon of the passing airstream and means projecting at outer surface portions of said apertured wall portions operative to trap portions of the moving airstream and pressure the same to move inwardly of the apertures in said wall portions to support combustion in said combustion chamber.

2. A gas burner unit as in claim 1 wherein said apertured wall portions include differentially sized apertures, the apertures most adjacent said gas manifold being smaller than the apertures remote therefrom.

3. A gas burner unit as in claim 1 wherein a portion of the gas manifold forms a base for said apertured wall portions to define said combustion chamber and said gas manifold portion is formed for delivery of gas to said combustion chamber in jet form.

4. A gas burner unit as in claim 3 wherein said portion of the gas manifold is a plate forming one wall of the manifold chamber and having therein a series of apertures which peripherally rim the base of said combustion chamber.

5. A gas burner unit as in claim 3 wherein said portion of the gas manifold is a plate means which has defined peripherally thereof slot discharge means for delivery of gas to said combustion chamber in a generally rimming relation to its base.

6. A gas burner unit for disposition in an airstream to draw air therefrom for combustion and to heat the airstream on passage thereby comprising means defining a gas manifold including an imperforate wall section for disposition in the face of and transverse to the airstream, means defining a combustion chamber in connection with said gas manifold including apertured wall portions, said apertured wall portions being so arranged to preclude direct impact thereon of the passing airstream and means projecting at outer surface portions of said apertured wall portions operative to trap portions of the moving airstream and pressure the same to move inwardly of the apertures in said wall portions to support combustion in said combustion chamber, said burner unit having a receptacle form, said gas manifold providing its bottom, said apertured wall portions peripherally rimming said bottom substantially in line with the marginal edges thereof, and said air-trapping means projecting peripherally of the receptacle in the form of platelike segments which incline rearwardly to and outwardly of said bottom.

7. A gas burner unit as in claim 6 wherein said receptacle has a cuplike form and a plate means fixed transversely thereof and generally parallel to its bottom to form therein said gas manifold, said imperforate section constituting the receptacle base, means defining passages at peripheral portions of said plate means for the delivery of gas to said combustion chamber in jet form.

8. A gas burner unit for disposition in an airstream to draw air therefrom for combustion and to heat the airstream on passage thereby comprising means defining a gas manifold including an imperforate wall section for disposition in the face of and transverse to the airstream, means defining a combustion chamber in connection with said gas manifold including apertured wall portions, said apertured wall portions being so arranged to preclude direct impact thereon of the passing airstream and means projecting at outer surface portions of said apertured wall portions operative to trap portions of the moving air stream and pressure the same to move inwardly of the apertures in said wall portions to support combustion in said combustion chamber, said gas manifold and the apertured wall portions of said combustion chamber having apertures so arranged and formed to respectively provide for the delivery to said combustion chamber of jets of gas and jets of air which are substantially at right angles to each other and there being ignition means arranged in said combustion chamber whereby to produce on operation thereof a plurality of flames standing substantially perpendicular to the walls of said combustion chamber.

9. A gas burner unit for disposition in a high velocity airstream to draw air therefrom for combustion and to heat the air on passage thereby comprising a burner section having perforate wall portions for positioning downstream of the source the airstream, means at the upstream end of said burner section positioning adjacent and transverse to said perforate wall portions, defining thereby a combustion chamber open to its downstream end, means for directing gas to and through said last-named means to said combustion chamber, and means extending obliquely and reversely of said perforate wall portions, in an upstream direction, to trap air in said stream and convert the velocity thereof to static pressure whereby to pressure flow the air required for combustion through said perforate wall portions, said obliquely extending means being plate segments based on said burner section in the location of said perforate wall portions, which plate segments extend in an upstream direction a distance to overlap at least a part of said perforations.

10. A gas burner unit for disposition in a high velocity air stream to draw air therefrom for combustion and to heat the air on passage thereby comprising a burner section having perforate wall portions for positioning downstream of the source of the airstream, means at the upstream end of said burner section positioning adjacent and transverse to said perforate wall portions, defining thereby a combustion chamber open to its downstream end, means for directing gas to and through said last named means to said combustion chamber, and means extending obliquely and reversely of said perforate wall portions, in an upstream direction; to trap air in said stream and convert the velocity thereof to static pressure whereby to pressure flow the air required for combustion through said perforate wall portions, said perforate wall portions defining a rectangular burner section, each side of which is apertured and has obliquely extending winglike projections for trapping air.

11. A gas burner unit for disposition in an airstream to draw air therefrom for combustion and to heat the air on passage thereby comprising a housing including a base which is imperforate, and wall portions which are perforated plate means defining in said housing a gas manifold chamber having jet discharge openings, wall portions of said housing including said perforated portions defining with said plate means a combustion chamber, said housing base being arranged for positioning in an opposed blocking relation to said airstream and to shield said perforated wall portions from direct impact therein by the passing airstream, a portion of said housing opposite said base having an opening from said combustion chamber and there being air control means for creating in said combustion chamber jets of air substantially perpendicular to said perforated wall portions and means for ignition of gas issuing to said combustion chamber from said jet discharge openings whereby to produce a multitude of undivided jet flames standing perpendicular to said plate means and said perforate wall portions to comingle in a concentration of the developed heat.

12. A gas burner unit for disposition in an airstream to draw air therefrom for combustion and to heat the air on passage thereby, including means defining a burner section to position in the air stream, means at the upstream end of said section closing said end and forming a manifold chamber, said closing means including a perforate wall in transverse connected relation to downstream projecting wall means forming with said perforate wall a combustion chamber in said burner section downstream of said manifold chamber, a portion of longitudinal extent of said projecting wall means being apertured for admission of air from said stream into said combustion chamber, means for admitting as to said manifold chamber to discharge through said perforate wall to mix in said combustion chamber with admitted air, and external free standing wing means on said projecting wall means extending obliquely thereof in an upstream direction converting air velocity over the exterior of said burner section to static pressure forcing air through the apertured portion thereof.

13. A gas burner unit according to claim 12, said burner having a multisided configuration, open at its downstream end and closed at its upstream end by said manifold chamber, the sides forming said projecting wall means being apertured intermediate said manifold and the downstream end, said wing means being formed by bending back the terminals of said sides at their downstream ends to overlap at least a part of the apertured portion of respective sides.

14. A gas burner unit according to claim 13, wherein said perforated wall is configured to be received within the burner sides near the upstream ends thereof, the upstream ends of said sides terminating in a transverse imperforate wall cooperating with said perforate wall and with said sides to define the manifold chamber.

15. A gas burner unit according to claim 13, wherein the sides are approximately parallel to one another and to a longitudinal axis of the burner section, said section disposing longitudinally of the airstream, the apertured portions of said sides terminating at the upstream end short of said manifold chamber and at the downstream end short of a line along which said wing means are bent back.

16. A gas burner unit according to claim 12 wherein said projecting wall means is comprised of a plurality of approximately parallel sidewalls defining a burner section of rectangular configuration, said sidewalls terminating at their one ends in said manifold chamber and at their opposite ends being bent backwards to overlie a portion only of respective sidewall whereby to define said wing means, said sidewalls individually having apertured portions of longitudinal extent.

UNITED STATES PATENT OFFICE
CERTIFICATE OF CORRECTION

Patent No. 3,586,300                    Dated June 22, 1971

Inventor(s) Homer K. Monroe

It is certified that error appears in the above-identified patent and that said Letters Patent are hereby corrected as shown below:

Column 1, line 25, add a comma after "construction".

Column 2, line 73, insert "to" preceding "be".

Column 5, line 66, insert a comma after "shutdown".

Column 8, line 48, insert a comma after "perforated".

Column 9, line 2, amend "as" to read -- gas --.

In each of the following, amend "comingle" to read -- co-mingle -- :

Column 1, line 72;
   Column 2, line 17;
   Column 5, line 43;
   Column 8, line 64.

Signed and sealed this 14th day of March 1972.

(SEAL)
Attest:

EDWARD M. FLETCHER, JR.                 ROBERT GOTTSCHALK
Attesting Officer                       Commissioner of Patents